US006757591B2

(12) United States Patent
Kramer

(10) Patent No.: US 6,757,591 B2
(45) Date of Patent: Jun. 29, 2004

(54) ENERGY MANAGEMENT SYSTEM AND METHODS FOR THE OPTIMIZATION OF DISTRIBUTED GENERATION

(76) Inventor: Robert A. Kramer, 910 S. Ridge St., Crown Point, IN (US) 46307

( * ) Notice: Subject to any disclaimer, the term of this patent is extended or adjusted under 35 U.S.C. 154(b) by 29 days.

(21) Appl. No.: 09/928,040

(22) Filed: Aug. 10, 2001

(65) Prior Publication Data

US 2002/0082747 A1 Jun. 27, 2002

Related U.S. Application Data

(60) Provisional application No. 60/224,606, filed on Aug. 11, 2000.

(51) Int. Cl.[7] .............................................. G06F 19/00
(52) U.S. Cl. ........................ 700/288; 700/291; 700/297
(58) Field of Search ................................ 700/276, 288, 700/291, 295–297

(56) References Cited

U.S. PATENT DOCUMENTS

| 4,604,714 | A | * | 8/1986 | Putman et al. .............. 700/288 |
| 4,686,378 | A | * | 8/1987 | Sisk .............................. 290/2 |
| 5,751,604 | A | * | 5/1998 | Yamauchi .................... 700/288 |
| 5,835,383 | A | * | 11/1998 | Onizuka et al. ............. 700/297 |
| 6,311,105 | B1 | * | 10/2001 | Budike, Jr. ................. 700/291 |
| 6,392,386 | B2 | * | 5/2002 | Schulmayr et al. .......... 320/132 |
| 6,459,171 | B1 | * | 10/2002 | Leifer .......................... 307/52 |
| 6,532,454 | B1 | * | 3/2003 | Werbos ......................... 706/14 |
| 6,542,791 | B1 | * | 4/2003 | Perez ........................... 700/295 |
| 2001/0025209 | A1 | * | 9/2001 | Fukui et al. ................. 700/291 |

OTHER PUBLICATIONS

Kramer, R.A., *The Dependent Behavior of Distribution Systems Containing Repairable Components*, Probability Methods Applied to Electric Power Systems (PMAPS) Second International Symposium, Sep., 1988, pp. 38–1 to 38–13.

(List continued on next page.)

*Primary Examiner*—Leo Picard
*Assistant Examiner*—Elliot Frank
(74) *Attorney, Agent, or Firm*—Marshall, Gerstein & Borun LLP

(57) ABSTRACT

An energy management system and method is provided for managing the generation and distribution of energy from an energy source to a building. The building has a desired building environment and a total energy profile including a thermal energy requirement and an electrical energy requirement. The energy management system comprises an energy generator arranged to convert energy from the energy source to thermal energy and electrical energy, a heat recovery unit arranged to recover byproduct heat from the energy generator, a cooling unit arranged to use a first portion of the thermal energy to drive a refrigeration unit, a heating unit arranged to use a second portion of the thermal energy to drive a heating unit, a heat storage unit arranged to store excess heat, and an energy optimizing controller.

27 Claims, 12 Drawing Sheets

OTHER PUBLICATIONS

Kramer, Robert A. et al., *Evaluation of Substation Physical State By Use of Harmonic and Transient Monitoring Equipment*, Proceedings of the American Power Conference, vol. 51, 1989, pp. 457–460.

Kramer, Robert A., *Considerations of Heavy Industrial Load in Regard to Electric System Reliability*, Proceedings of the American Power Conference, vol. 52, 1990, pp. 449–452.

Kramer, Robert, *Optimizing the Economic and Technical Viability of "Whole Building Efficiency" through Combined Heat and Power and Advanced Control Systems*, Jan. 19, 2000, pp. 1–13.

Kramer, Robert, *System Integration of Distributed Power for Complete Building Systems*, Aug. 2, 2000, pp. 1–18.

Kramer, Robert, Presentation Slide materials entitled *Enhancing the Operation of Highly Varying Industrial Loads to Increase Electric Reliability, Quality, and Economics*, presented at a meeting regarding Technology for the Steel Industry, Nov. 22, 2000, Pittsburgh, PA.

Kramer, Robert, *Optimizing the Economic and Technical Viability of Combined Heat and Power Systems for Maximum Reliability, Efficiency, and Environmental Protection*, initially filed Apr. 19, 2001, revised May 4, 2001, pp. 1–13.

Ross, Timothy J., *Fuzzy Logic with Engineering Applications*, McGraw–Hill, Inc., 1995, pp. 504–508.

Shoureshi, Rahmat, et al., *Derivation and Implementation of Fuzzy Optimal Climate Control*, Proceedings of the American Control Conference, Jun., 1993, pp. 1860–1864.

Shoureshi, Rahmat, et al., *Neural–Based Short–Term Load Forecasting for Electric Utilities*, presented at the $22^{nd}$ International Conference for Computers and Industrial Engineering, Cairo, Egypt, Dec. 20–22, 1997, pp. 1–3.

Shoureshi, Rahmat, et al., *Intelligent Control for Electrical Power Generation Systems*, DSC–vol. 61, Proceedings of the ASME, Dynamic Systems and Control Division, ASME 1997, pp. 251–256.

\* cited by examiner

| OUTPUT | | | | INPUT VARIABLE 2 |
|---|---|---|---|---|
| 10 | 6 | 4 | HIGH | |
| 4 | 4 | 2 | MEDIUM | |
| 2 | 0 | 0 | LOW | |
| HIGH | MEDIUM | LOW | | |
| INPUT VARIABLE 1 | | | | |

*FIG. 7*

ENERGY MANAGEMENT SYSTEM AND METHODS FOR THE OPTIMIZATION OF DISTRIBUTED GENERATION

CROSS-REFERENCE TO RELATED APPLICATION

The priority benefit of U.S. Provisional Application No. 60/224,606 filed Aug. 11, 2000, the entire disclosure of which is incorporated herein by reference, is claimed.

BACKGROUND OF THE INVENTION

1. Field of the Invention

The invention relates generally to distributed generation energy systems and, more specifically, to a distributed generation energy system having an energy management system that optimizes and controls the generation and usage of energy to maintain a desired building environment at minimum cost.

2. Brief Description of Related Technology

Conventional power generation is typically based on a process in which fuel is burned as a source of energy to turn a turbine. For example, in the case of a base load power plant, coal is burned to obtain heat, the heat is converted to steam, and steam pressure is used to turn one or more turbines. The turbines in turn generate electrical power. Unfortunately, conventional power generation is an inherently inefficient process, with much of the total energy value of the fuel source being lost in the form of wasted heat. Typically, only a small fraction of the total energy value of the fuel is extracted from the fuel and ultimately useable as electrical power.

Cogeneration processes have been developed in order to increase the overall efficiency of the power generation process. In contrast to conventional power generation, cogeneration makes use of at least some of the waste heat, usually by extracting a portion of the waste heat from the low-temperature steam exhausted from the turbines. The recovered heat may be used directly in the form of a hot air stream. Alternatively, the recovered heat may be used to create additional steam, which is then used to generate still more electrical power.

Other processes have been developed in the continuing attempts to maximize the overall efficiency of power generation and energy extraction. For example, natural gas is favored as a fuel source because it is clean burning with low emissions. Thus, gas-fired turbines are often used to generate electricity. In some cogeneration power plants, these clean-burning gas-fired turbines are coupled with heat exchangers which extract heat from the stream of hot exhaust gases. The exhaust gases are not released until a maximum amount of thermal energy has been recovered. These gas-fired power plants, which are often manufactured as independent, stand alone units, are therefore more efficient producers of electricity, hot water, or steam, and have the added benefit of producing negligible emissions.

Although cogeneration systems offer increased efficiency relative to more conventional power plants, further increases in overall energy efficiency are desirable.

SUMMARY OF THE INVENTION

In accordance with an aspect of the invention, an energy management system is provided for managing the generation and distribution of energy from an energy source to a building. The building has a desired building environment and a total energy profile including a thermal energy requirement and an electrical energy requirement. The energy management system comprises an energy generator arranged to convert energy from the energy source to thermal energy and electrical energy, a heat recovery unit arranged to recover byproduct heat from the energy generator, a cooling unit and/or a dessicant unit arranged to use a first portion of the thermal energy to provide cooling and/or dehumidification, a heating unit arranged to use a second portion of the thermal energy to drive a heating unit, a heat storage unit arranged to store excess heat, and an energy optimizing controller. The energy optimizing controller includes a thermal flow controller and an electrical flow controller, with the thermal flow controller being arranged to distribute the thermal energy and the recovered byproduct heat to at least one of the cooling unit, the heating unit, and the heat storage unit. The electrical flow controller is arranged to distribute electrical energy to at least one of a plurality of electrical components, with the energy optimizing controller being arranged to establish a target total energy cost, calculate an index of performance indicative of an actual energy cost based on an actual electrical load and an actual thermal load, compare the actual energy cost to the target total energy cost, and adjust the distribution of the thermal and electrical energy to thereby obtain a minimum total cost.

In further accordance with a preferred embodiment, a thermally driven dessicant dehumidification system may be employed in order to reduce the humidity within the building, which thus lowers the amount of energy required for cooling purposes. Further, the electrical flow controller may be arranged to distribute electrical energy in the form of alternating current, direct current, or an optimized combination of alternating current and direct current.

BRIEF DESCRIPTION OF THE DRAWINGS

FIG. 7 is an exemplary fuzzy logic rule matrix used to construct the control surface of FIG. 6;

DETAILED DESCRIPTION OF THE DISCLOSED EMBODIMENTS

The following description of the disclosed embodiments is not intended to limit the scope of the invention to the precise form or forms detailed herein. Instead, the following description is intended to be illustrative of the principles of the invention so that others may follow its teachings.

Figure 1:
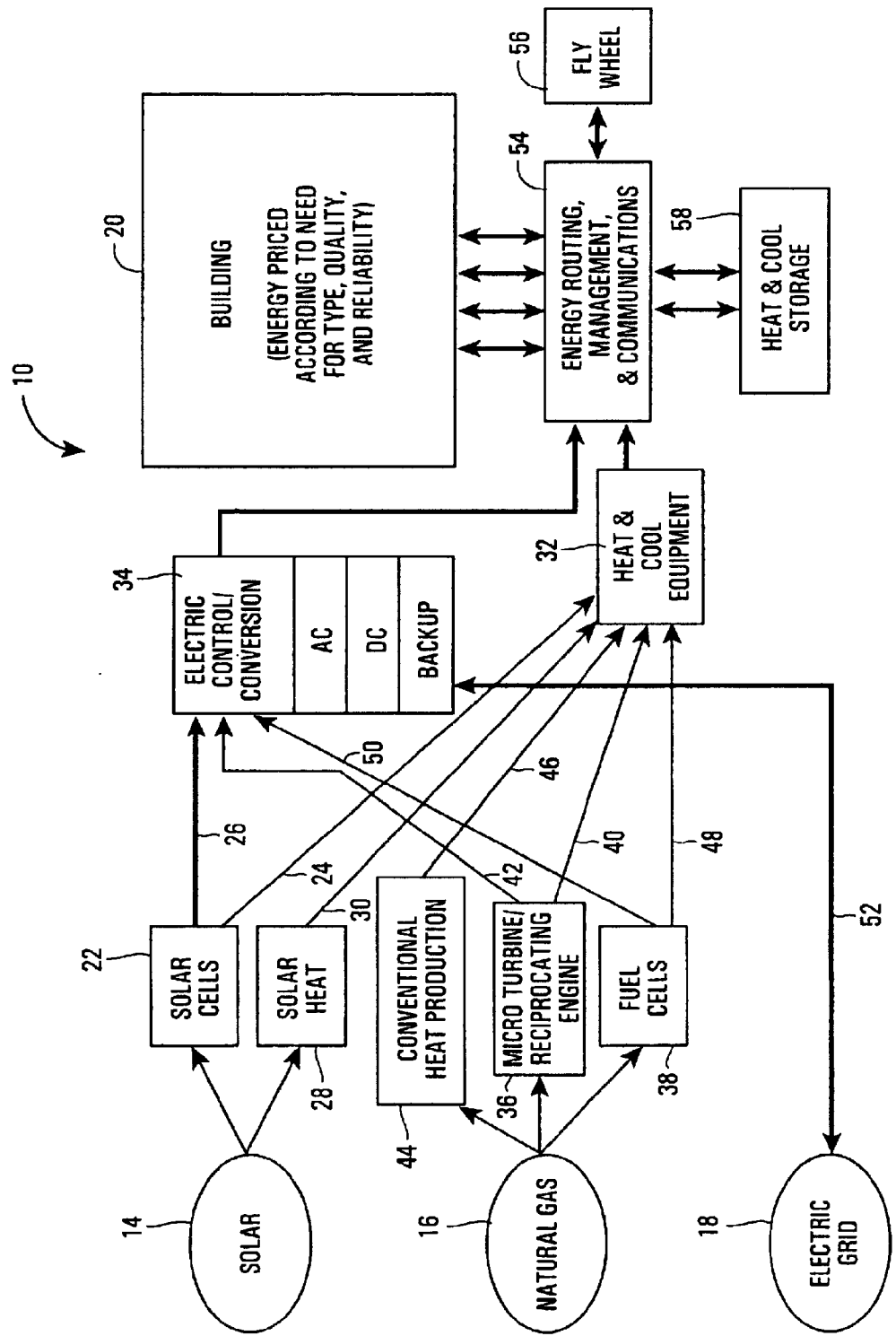
FIG. 1 is a schematic diagram of an energy management system constructed in accordance with the teachings of the invention.

Referring to FIG. 1, an energy management system, generally designated 10, in accordance with the invention includes one or more energy sources, such as, by way of example rather than limitation, a solar energy source 14 and a natural gas energy source 16. The energy management system 10 also includes a connection to an electric grid 18. The energy management system 10, along with the electric grid 18, are configured to meet the heating, cooling, and electrical needs of a building 20.

The solar energy source 14 includes solar cells 22 that produce thermal energy 24 and/or electrical energy 26. The solar energy source 14 may also include a solar heat assembly 28 that produces thermal energy 30. The thermal energy 24 and 30 are routed to heating and cooling equipment 32. The electrical energy 26 is routed to electric control/conversion equipment 34.

The natural gas energy source 16 includes a micro turbine 36 (or a number of micro turbines 36) and/or a system of fuel cells 38. A suitable micro turbine 36 may be obtained from Capstone Turbine Corporation of Chatsworth, Calif. Both 30 kw and 60 kw micro turbines have been tested. Other sizes may be chosen based upon the overall power requirements of the building 20. Alternatively, one or more reciprocating engines may be used in place of the micro turbine 36. The micro turbines 36 produce thermal energy 40 that is routed to the heating and cooling equipment 32, and electrical energy 42 that is routed to the electric control/conversion equipment 34. A conventional thermal heat producer, such as a gas furnace 44, may also be provided to produce a thermal energy stream 46. Further, the fuel cells 38 produce thermal energy 48 and electrical energy 50. The thermal energy 48 from the fuel cells 38 is routed to the heating and cooling equipment 32, while the electrical energy 50 from the fuel cells 38 is routed to the electric control/conversion equipment 34. The electric grid connection 18 supplies additional electrical energy 52 that is routed to or from the electric control/conversion equipment 34.

The energy management system 10 includes an optimization system 54, which optimizes the generation and usage of the electrical and/or thermal energy from all of the available sources. The optimization system 54 optimizes the usage of electrical energy from the electric control/conversion equipment 34, and optimizes the usage of the thermal energy from the heating and cooling equipment 32, thus optimizing the overall energy usage. The optimization process is explained in greater detail below.

In the event there is a surplus of available electrical energy, the excess electrical energy can be stored within a flywheel 56. As an alternative, excess electrical energy can be sold back to the electric grid 18 and/or stored in a conventional cell or battery. The available thermal energy within the heating and cooling equipment 32 is then assessed and the total energy cost is optimized. The thermal requirements for heating and/or cooling the building 20 for a desired building environment are then calculated based upon the occupancy and usage patterns of the building. The difference between the thermal output (available thermal energy) and the thermal requirements for the desired building environment is then calculated. If the thermal output of the heating and cooling equipment 32 is in excess of the thermal requirements for the building 20, the excess thermal energy may be stored in a heating and cooling storage unit 58 in a conventional manner. If there is insufficient thermal output from the heating and cooling equipment 32 to meet the thermal requirements of the building 20, additional thermal energy may extracted from the heating and cooling storage unit 58. The heating and cooling storage unit 58 may take a variety of forms. For example, the heating and cooling storage unit 58 may be a eutectic salt system which stores thermal energy as the eutectic salt changes phases between a liquid and a solid. Other forms of thermal storage battery systems are known.

Figure 2:
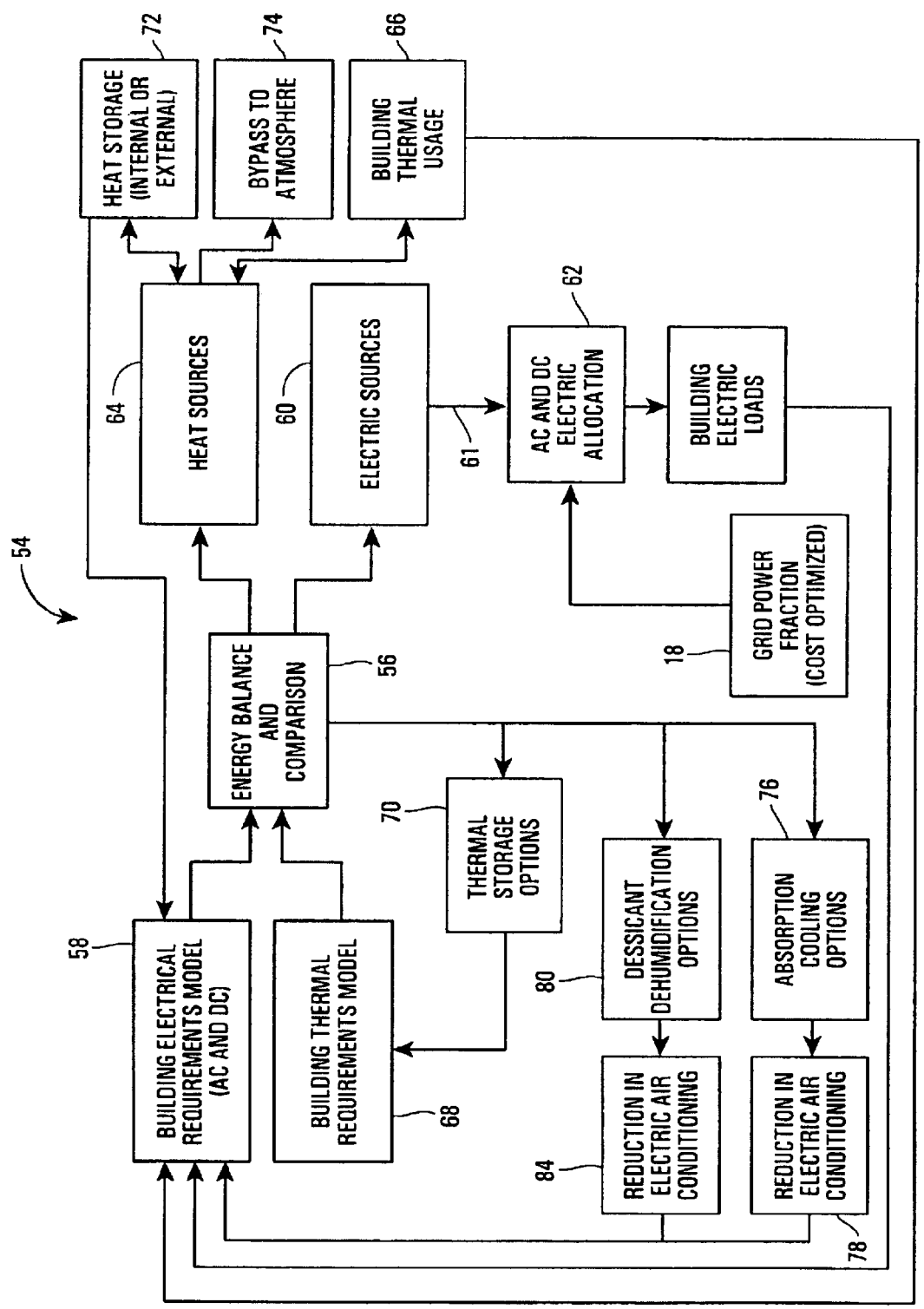
FIG. 2 is a schematic diagram of an optimization scheme in accordance with the teachings of the invention for use with the energy management system of FIG. 1.

Referring now to FIG. 2, the optimization system 54 from FIG. 1 is described in more detail. The optimization system 54 continually optimizes the usage of energy and byproduct heat from the various energy sources in order to maintain a desired building environment at a minimum cost. This is shown by an energy balance and comparison step at 56. The electric demand for the building is calculated at 58. Local electrical energy sources 60, such as the solar energy source 14 and the micro turbine 36, provide an electric output 61 that is set to meet a calculated minimum cost of electric energy. The electrical energy utilization is controlled by a subsystem that optimizes its value with respect to the local energy usage, the generation of electrical energy from the local electrical energy source 60, and electrical energy from the electric grid 18 provided to the building. This subsystem also provides a combination of alternating current and direct current 62 for various applications, as it may be advantageous to utilize at least a portion of the generated electrical energy in the form of direct current rather than converting to alternating current. The subsystem may also optimize the portion of the electrical energy used as direct current.

The various heat sources 64 within the building are then considered, such as the thermal output from the micro turbine(s) 36, fuel cells 38, the thermal output of the solar energy source 14, and/or any auxiliary furnaces that might be present in the building. The thermal usage patterns of the building (which are typically based on occupancy patterns) are then observed at 66, and a thermal requirement for heating and/or cooling of the building to maintain a desired building environment is calculated at 68. The difference between the thermal output of the heat sources 64 and the thermal requirement for the desired building environment 68 is then calculated. If there is excess thermal output, the excess thermal output is preferably allocated to fast response thermal storage at 70, 72. If a maximum temperature is reached within the fast response thermal storage unit 70, 72, heat may be dumped to the atmosphere at 74 through a bypass valve, the generation of heat may be decreased, or the heat may be cooled by means of an absorption cooling device 76, thereby decreasing the need for electric air conditioning (shown at 78). In addition, if the level of humidity within the building needs to be decreased, the heat may be routed to a dessicant dehumidification device 80.

Figure 3:
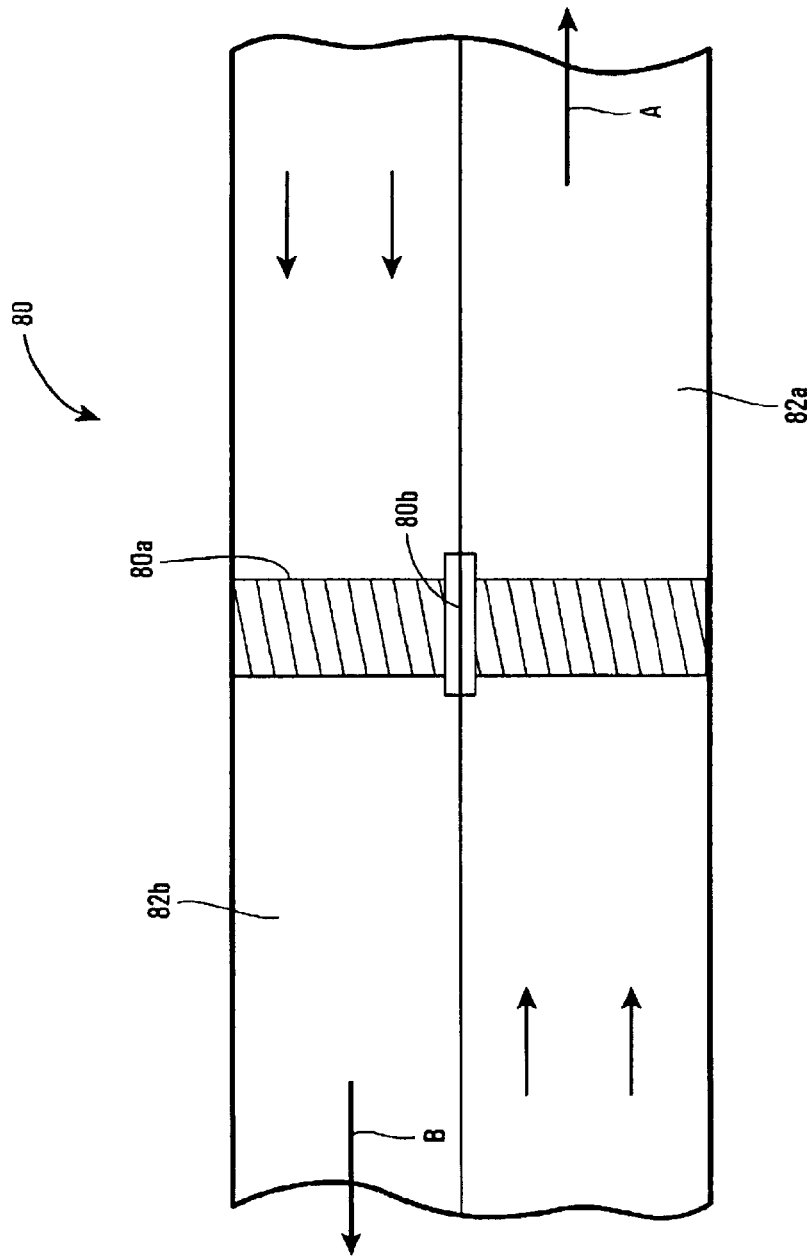
FIG. 3 is a fragmentary cross-sectional schematic view of a dessicant wheel disposed in a duct system.

As shown schematically in FIG. 3, the dessicant dehumidification device 80 includes a dessicant wheel 80a (shown in cross section in FIG. 3) which rotates about a central axis 80b. A lower duct 82a routes warm, humid air past the lower portion of the dessicant wheel 80, while an upper duct 82b routes heated air, such as waste heat, past an upper portion of the dessicant wheel 80. The dessicant wheel 80 absorbs humidity in the lower duct 82a, thus saturating that portion of the dessicant wheel 80. The dry air leaving the dessicant wheel 80 is returned to the building at A. As the dessicant wheel 80 rotates about its axis 80b, the saturated portion of the wheel travels to the upper duct 82b, where the saturated portion is exposed to the hot air. The hot air regenerates the dessicant, and the humid air is exhausted at B.

Because approximately half or more of the air conditioning in a typical heating, ventilating, and air conditioning (HVAC) application is used for dehumidification, the use of a dessicant dehumidification system 80 thereby decreases the need for electric air conditioning (shown at 84 in FIG. 2). The choice is made based upon a calculation of the optimal cost based on a comparison between the cost of generating additional heat for use in the dehumidification system 80, and the cost of using additional electric air conditioning 84.

If the calculation for the difference between the thermal output of the heat sources 64 and the thermal requirement for the desired building environment 68 results in an insufficient amount of heat to meet the thermal requirements for the desired building environment, heat is preferably extracted from the fast response thermal storage unit 70, 72 or an auxiliary furnace (not shown), based upon a cost optimization of the value of the energy.

Figure 4:
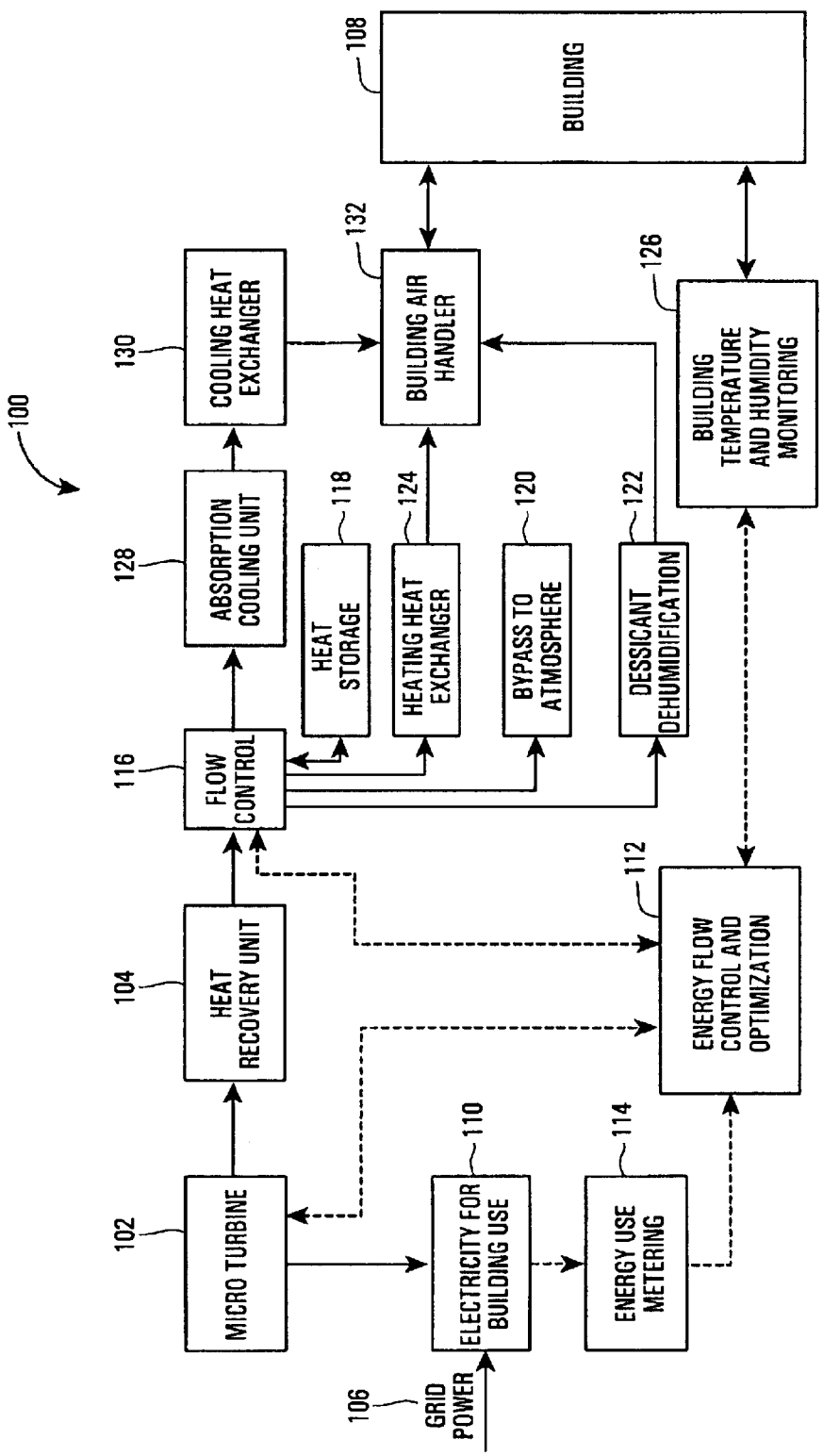
FIG. 4 is a schematic diagram of a preferred embodiment of the energy management system of the invention.

FIG. 4 illustrates a distributed generation system 100 assembled in accordance with the teachings of another disclosed embodiment of the invention. A micro turbine 102 produces thermal energy, which is recovered by a heat recovery unit 104, and also produces electrical energy. A connection to an electric grid 106 provides additional electrical energy. The amount of electrical energy needed for a building 108 is set to meet a minimum cost of energy at 110. An energy flow control and optimization unit 112 controls and optimizes the required amounts of electrical energy at 114 and the required amounts of thermal energy for the building 108 by monitoring the amounts of each form of energy that is used or needed. A flow control device 116 then routes the thermal energy and/or electrical energy to various portions of the building 108 as needed based upon the occupancy and usage patterns of the building 108. If there is excess thermal energy, it can be stored in a heat storage unit 118 or, if the heat is not needed the heat may be dumped into the atmosphere, through a bypass valve 120. The excess thermal energy may take the form of a thermal stream exiting the micro turbine 102. Should the excess thermal energy be needed (for example, in the form of hot air or to recharge a dessicant dehumidification system 122), the thermal energy can be routed to the appropriate component. If there is a sufficient amount of thermal energy that needs to be allocated to the building, the thermal energy can be converted into heat through use of a heat exchanger 124.

Depending on the building temperature monitoring that occurs at 126, the thermal energy might need to be converted into cooler air rather than heat. In this case the thermal energy can be sent to an absorption cooling unit 128 and a cooling heat exchanger 130. The resulting heated or cooled air is then directed to a building air handler 132, which thereby directs the heated or cooled air to various portions of the building 108.

Figure 5:
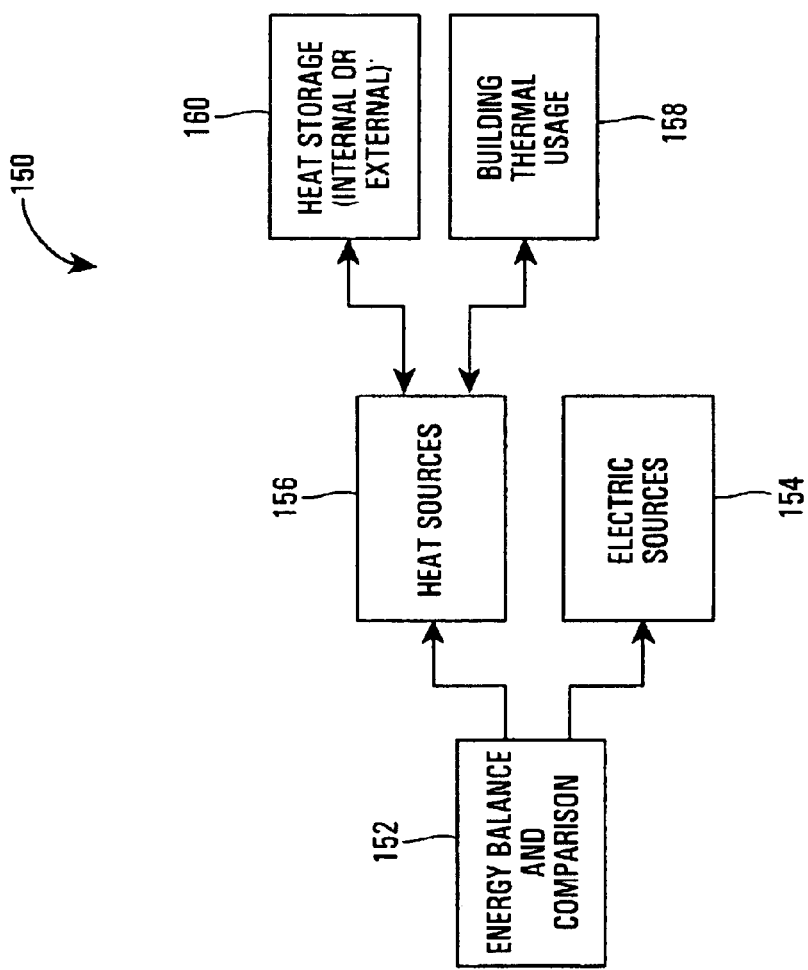
FIG. 5 is a schematic diagram of another preferred embodiment of the energy management system of the invention.

Another preferred embodiment of the invention is designated generally 150 in FIG. 5. The system 150 optimizes the usage of energy and heat from various energy sources to maintain a desired building environment at minimum cost. This is shown by an energy balance and comparison step at 152. The electric demand for the building is calculated and an electric output 154 is set to meet a calculated minimum cost of electric energy. Various heat sources 156 within the building are then assessed to determine the amount of thermal energy available. The heat sources may include micro turbines, fuel cells, solar heating sources, and/or any auxiliary furnaces that might be present in the building. The thermal usage patterns of the building are then observed at 158, and a thermal requirement for heating and/or cooling of the building to maintain a desired building environment is calculated. The difference between the thermal output of the heat sources 156 and the thermal requirement for the desired building environment is then calculated. If there is excess thermal output, the excess thermal output is preferably allocated to fast response thermal storage at 160. If a maximum temperature is reached within the fast response thermal storage unit 160, either heat is dumped to the atmosphere or the generation of heat is decreased based upon an optimal calculation of cost for either action. Additionally, or alternatively, heat may be stored in regions of the building. If the calculation for the difference between the thermal output of the heat sources 156 and the thermal requirement for the desired building environment results in an insufficient amount of heat to meet the thermal requirements for the desired building environment, heat is preferably extracted from the fast response thermal storage unit 160 or an auxiliary furnace (not shown), based upon a cost optimization of the value of the energy.

Distributed combined heat and power systems assembled in accordance with the disclosed embodiments offer further increases in overall fuel efficiency in conjunction with offering increased service reliability and lower costs to the consumer. In a distributed combined heat and power system, a stand alone power generation system provides electrical energy and thermal energy to a building. The power generation system may generate electrical and thermal energy from a number of sources, including, for example, natural gas, waste gas such as refuse generated methane gas, solar energy, and other sources.

In a distributed combined heat and power system, the usage of the combined thermal and electrical energy from the variety of energy sources is controlled and optimized so as to achieve a minimum overall energy cost. In an optimized distributed combined heat and power system, an entire building may be modeled as a system that can be controlled, regulated and interconnected with the external electric grid. The system may have the capacity to generate electrical energy in a number of ways, including from sources such as solar energy assemblies, micro turbines, fuel cells, reciprocating engines, flywheels, or other electricity storage devices.

The system may also have the capacity to capture and use thermal energy form a variety of sources, including streams of recovered byproduct heat from micro turbines and fuel cell reformers. The system may also obtain solar heat directly via active and passive solar heat assemblies and may extract heat from the surrounding atmosphere. The system may also achieve additional efficiencies by optimizing the use of a building's inherent heat storage capacity, and/or by using a fast response thermal storage unit based upon eutectic salt or thermal mass storage technology. Thus, it is possible to reduce the total energy cost for the chosen building application while simultaneously increasing the reliability and quality of the supplied energy streams.

By utilizing energy sources in a localized fashion, (i.e., at the building), which may be used in conjunction with the conventional electric grid, the inventive system may provide electricity and/or thermal energy of specifiable reliability and quality. Additional efficiencies may be gained by recovering a maximum amount of normally wasted heat energy. Further, by controlling the flow and usage of energy, both thermal and electrical, within the building, the overall efficiency of the energy usage is thus further increased, thus reducing the overall cost.

Preferably, the system includes a series of subsystems that optimize the energy usage at the building location. By including building considerations such as building electrical and thermal load patterns and other building energy demand considerations and variables as part of the overall energy usage profile, the system may achieve increased efficiency of between 75% to 80% compared to other systems. As a result, many building systems such as HVAC systems and various electrical systems can be downsized, again reducing cost.

Widespread implementation of such improved and more efficient distributed combined heat and power systems may save ratepayers great amounts in energy costs, and may on an annual basis, greatly reduce carbon dioxide, sulfur dioxide, and nitrogen oxide emissions.

An integrated optimizing control system optimizes the usage of the energy sources and optimizes the usage of the generated energy (i.e., both thermal and electrical energy)

within a building resulting in decreased net energy costs, increased reliability, and increased power quality. On a continuous basis, the system evaluates the price of the electric grid, the price of locally generated electricity, and the cost and the value of heat from the various available sources. The system then continually adjusts the usage to achieve an optimal cost. The system also provides an environmentally friendly solution for energy management because of the use of waste heat, and further provides the end user with the ability to customize the desired power quality and reliability options.

The system utilizes a building's inherent heat storage capacity and other available energy sources to reduce the total energy cost for the building while at the same time increasing the reliability and quality of the supplied energy streams.

Solar energy assemblies in the form of solar cells and/or active or passive solar heat assemblies may also be provided in order to provide electrical and thermal energy. Passive solar energy may be configured into the basic design of the building such that there is an optimization of this thermal energy source as well as a consideration of the amount of heat storage within the building. Preferably, a fast response thermal storage system is employed, which allows for the rapid supply of thermal energy during changing environmental and economic conditions of the building.

Further, artificial intelligence systems based on fuzzy logic and neural networks may be used to further optimize and control the system. A neural network is an information processing system that may include an array of highly interconnected processor nodes that have a similarity to living neurons. These artificial neurons are arranged in interconnected layers. The network is programmed, in the simplest case, by comparing actual output values with desired output values and adjusting the weighting of the interconnections between the layers to produce the desired output values for one or more sets of training input values.

Neural networks may be used for two purposes. First, the networks may be used as part of a feed forward predictive system. This system will allow for characterization of the building energy system and its subsequent optimization. Second, the networks may be used to predict building occupancy patterns based on regional energy usage, and may change the energy content of these regions by changing either the sensible or possibly a portion of the latent heat of the particular region.

The neural networks preferably divide the building into zones and define usage patterns of each of the zones within the building. Then, low usage portions of the building may be used to store heat for use by high usage portions of the building. These occupancy patterns shift throughout the day, and the system adapts dynamically to these patterns with the intent of minimizing the net thermal energy use of the building. Such a predictive scheme will allow the building itself to become an energy storage system. Such energy storage will reduce the total energy costs by shifting energy from where it is not needed to regions of the building where it can be of most value. This will allow for optimization of the building energy system and will provide information for potential reductions in the HVAC capital expenditures anticipated for smaller buildings. The fast response thermal storage option will greatly enhance the value of the waste heat and overall efficiency of the energy system.

Natural gas energy sources include distributed generation sources of heat or electricity such as micro turbines, reciprocating engines, fuel cells, and/or conventional HVAC components that are driven by natural gas. For the distributed generation options, electricity and heat may be produced by micro turbines, reciprocating engines, fuel cells, and/or other electricity producing devices.

The heat produced as a byproduct of the electric generation process may be recovered by means of a system that heats a flowing heat transfer medium, such as propylene glycol. Additional heat may also be recovered from passive solar heating assemblies in the building. This heat is then utilized for direct heating, cooling by means of absorption cooling devices, and/or stored for later use.

Electricity and heat may be produced by one or more of a micro turbine(s), a reciprocating engine(s), and/or fuel cells. Renewable resources including photoelectric generation, active solar heating and lighting, and passive solar heating and lighting may also provide energy. By actively integrating the produced electricity with thermal energy sources and fast response thermal storage, it is possible to provide multiple levels of power quality and reliability as well as reduced overall energy costs.

The electrical energy utilization is controlled by a subsystem that optimizes its value with respect to the local energy usage as well as competitive electric energy sources such as energy from the electric grid of the building. This subsystem may also provide a combination of alternating current and direct current for various applications contingent upon optimal usage profiles. One of the benefits of the system described herein is the ability to use direct current (DC) electricity directly, rather than converting the electricity into alternating current (AC). This provides a savings in electricity because normally a loss results when direct current is converted into alternating current using a conventional inverter such as an oscillator or chopper followed by a step transformer. By using the direct current directly, efficiency is increased. This also greatly enhances the reliability of the system since the inverter is typically a point of higher failure rate for those systems that contain standby or uninterruptable power supplies. The direct use of direct current also provides a cost savings because DC to AC conversion equipment is not needed.

The optimization system optimizes the usage of the energy and byproduct heat from the various energy sources to maintain a desired building environment at minimum cost. This optimization system first considers the electric demand for the building and sets an electric output to meet a calculated minimum cost of electric energy. Next, the various heat streams are considered, such as the thermal output from micro turbines and/or fuel cells, solar heating sources, or any auxiliary furnaces that might be present in the building. The occupancy and usage patterns of the building are then observed, and a thermal requirement for heating and/or cooling of the building is calculated. This thermal requirement is based upon a model of the building at various weather conditions and the geographic orientation of the building. The difference between the thermal output of the heat streams and the thermal requirement for the desired building environment is then calculated. If there is an excess thermal output, the excess thermal output is preferably allocated to fast response or other appropriate thermal storage until a maximum temperature is reached. If the maximum temperature is reached within the appropriate thermal storage unit, excess heat may be dumped to the atmosphere, or the generation of heat may be decreased based on an optimal calculation of cost for either action. If the calculation for the difference between the thermal output of the heat streams and the thermal requirement for the desired building environment results in an insufficient amount of heat to meet the heating requirements of the building, heat may be extracted from the fast response thermal storage or an auxiliary furnace, based upon a cost optimization of the value of the energy. The calculation of the difference between the thermal output of the heat streams and the thermal requirement for the desired building environment is crucial, because the thermal or time constant limits of the thermal storage cannot be exceeded.

Two approaches to the time response of the thermal storage can be used. The first approach establishes a dead band above and below the acceptable operating limits. The second approach continually estimates the time constant associated with the particular operating point. Both approaches or methods may be used within the optimizing system described herein and can be selected by user or system preference dependent upon operating conditions.

At this level the building itself is considered a thermal storage entity. A feed forward, fuzzy logic, and or neural network system may be utilized to learn the occupancy and usage patterns of the building and allocate thermal energy in the building as part of the cost optimization system. Various active building energy schemes, such as physical space reconfiguration (movable walls, lighting schemes and water walls) may be included. This level of optimization then may be included in an overall cost optimization system that considers external grid power as part of the optimization system. The index of performance for this calculation is the total energy cost (e.g., the total fuel cost and the total electrical energy cost), divided by the amount of useable energy (e.g., kilowatts of thermal and electrical energy).

To allocate thermal energy to the building appropriately, the particular characteristics for each energy source that provide the best economic and reliability value are preferably investigated. Each of these individual aspects may then become a degree of freedom for formulation of a global index of performance. This global index may then be optimized given the constraints within the physical and environmental aspects of the building. By doing this, the individual energy sources may be controlled in a manner that produces the maximum economic value within the constraints for the economics, reliability, power quality and environmental considerations.

In the preferred embodiment, the index of performance is defined as the cost per kilowatt of energy for a specific instant in time, where one kilowatt equals both electrical energy and thermal energy:

$$IP = (x1 + x2 + x3 + x4 + x5)/\zeta,$$

wherein $\zeta$=kilowatts of energy (electric and heat);
wherein
x1=natural gas cost;
x2=grid electric cost;
x3=solar electric cost;
x4=solar heat cost;
x5=grid electric backup cost;
wherein x1+x2+x3+x4+x5≦non combined heat and power gas and electric energy cost.

There are also numerous variables that are considered in the calculations of the index of performance, and they are as follows:
x6=turbine efficiency;
x7=fuel cell efficiency;
x8=turbine/fuel cell heat recovery efficiency;
x9=solar heating or cooling efficiency;
x10=fast response heat storage cost;
x11=fast response heat storage size;
x12=fast response heat storage time constant;
x13=solar heat incident on building;
x14=heat needed by building to maintain desired temperature;
x15=desired building temperature for occupied regions;
x16=electric usage (AC+DC);
x17=reliability of electric service;
x18=reliability of thermal service;
x19=power quality service cost;
x20=building thermal usage;
x21=building electric usage;
x22=fraction of electric supplied by gas distributed generation;
x23=fraction of electric supplied by grid;
x24=fraction of electric supplied as direct current;
x25=fraction of gas generation waste heat used for building heating;
x26=fraction of gas generation waste heat used for dessicant dehumidification;
x27=fraction of gas generation waste heat used for absorption cooling;
x28=temperature of heat storage;
x29=heat storage capacity for unoccupied regions of building;
x30=maximum Δ temperature of unoccupied region of building;
wherein heat storage minimum temperature ≦x28≦heat storage maximum temperature;
wherein minimum temperature>x31≦maximum temperature; wherein,
x24≦1,
x25≦1,
x26≦1,
x27≦1,
x30≦accepted level;
wherein minimum solar input≦x13≦maximum solar input; and
wherein x10≦direct heat production cost,
x11≦maximum allowable physical size,
x12≧minimum possible value.

Preferably, the analysis for the optimization of the index of performance is done in the time domain. Various frequency domain considerations and calculations may be performed during and/or after the optimization to supplement the optimization process.

Figure 6:
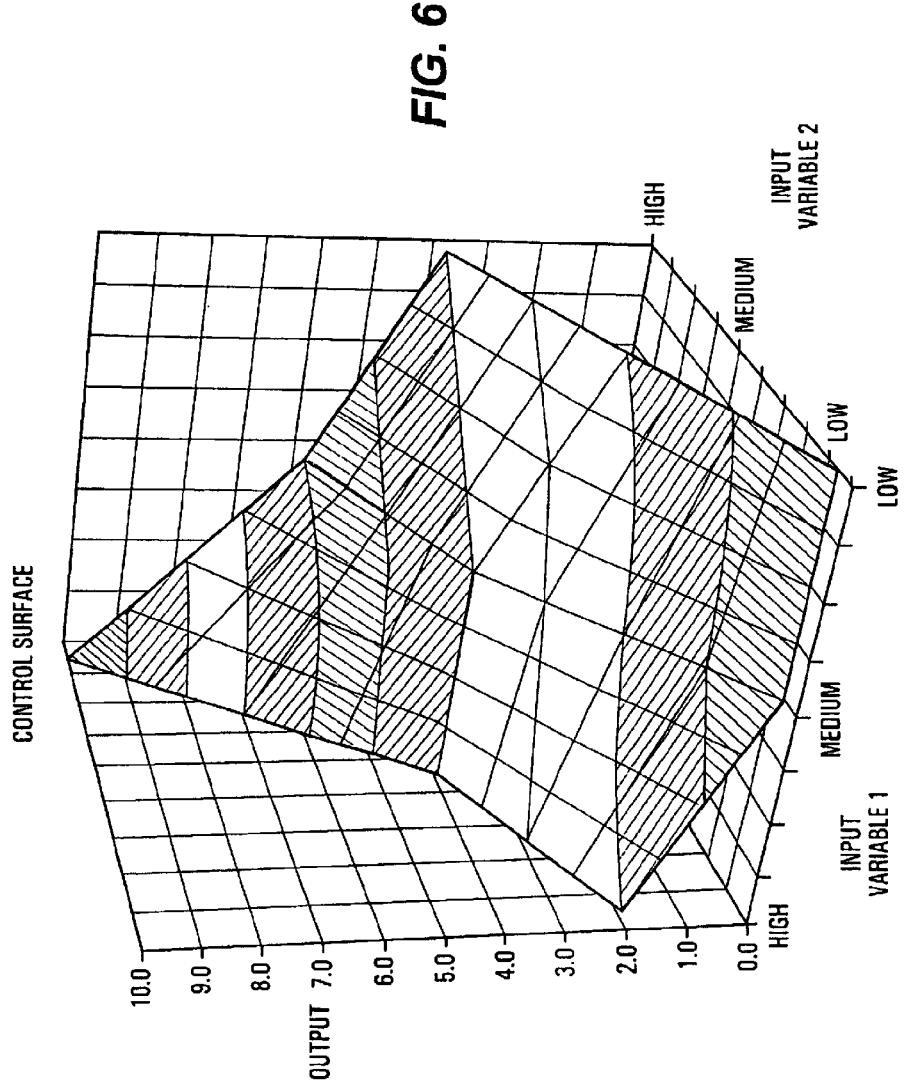
FIG. 6 is an exemplary fuzzy logic control surface.

To visualize the fuzzy control system, a multi-dimensional control surface may be used. Illustrated in FIG. 6 is one potential three-dimensional control surface. The value for a particular output variable is calculated by determining the output variable's degree of membership in each fuzzy input variable and mapping the input variables on to the multi-dimensional control surface. The final dimension of the control surface (the height in this case) is the value of the output variable. In the example shown, there are two input variables and one output variable. However, it should be understood that any number of different input and output variables could be used.

In practice, only a few points on the control surface are design coordinates that are stored in the system, with the remainder of the points on the control surface being determined via interpolation. In this example, nine design coordinates are used to define the three dimensional control surface, one for each combination of low, medium, and high of the two input variables. However, it should be understood that any number of design coordinates could be used to define the control surface, and that the control surface could have any number of dimensions.

Illustrated in FIG. 7 are rules, depicted in matrix and textual forms, associated with the design coordinates used to construct the control surface of FIG. 6. For example, the "center" rule states that if input variable 1 is "high" and input variable 2 is "medium," then set the output variable's value to 4. In another example, the following three rules may be used to define a portion of an exemplary control surface:
1) If the temperature differential is a large positive, then the heat bypass is large; 2) If the temperature differential is a medium positive; and 3) if the temperature differential is a small positive, then the heat bypass is small. A matrix may be considered a very coarse view of the control surface looking straight down from above. The values of the design coordinates are the outputs of the rules. The weight each of these rules carries can be adjusted by modifying the value of its output, thereby altering the shape of the control surface.

Figure 8:
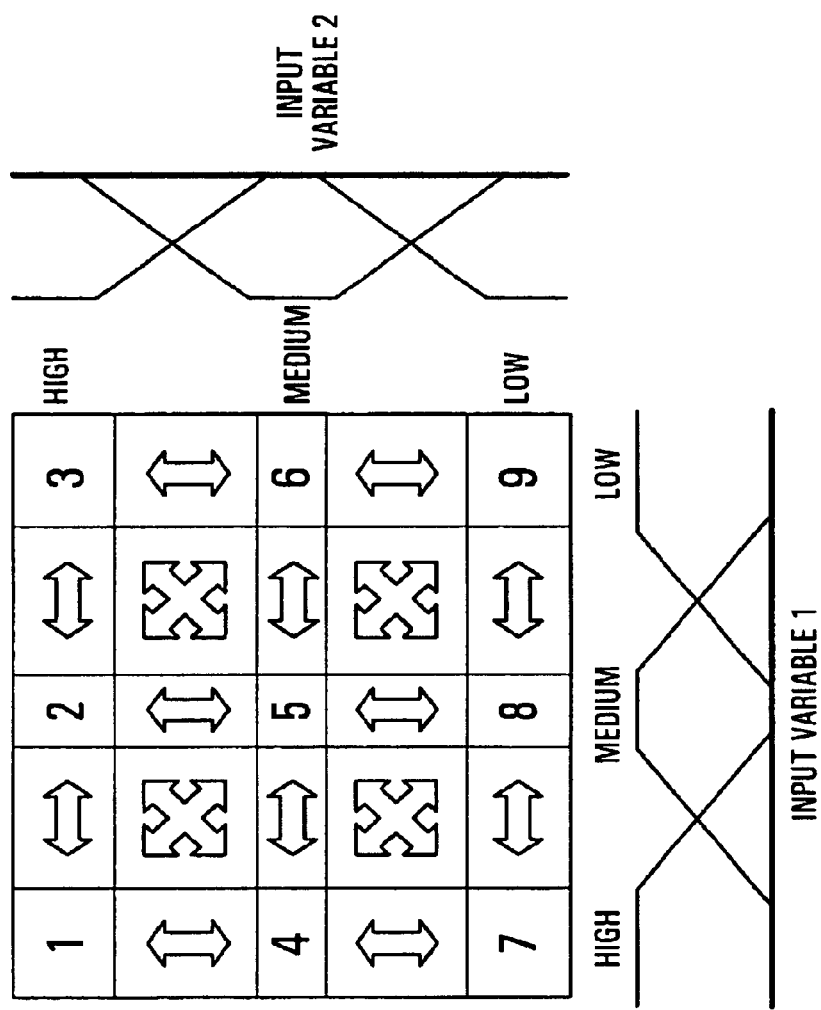
FIG. 8 is an exemplary interpolation map used in conjunction with the rule matrix of FIG. 7 to construct the control surface of FIG. 6.
Figure 9:
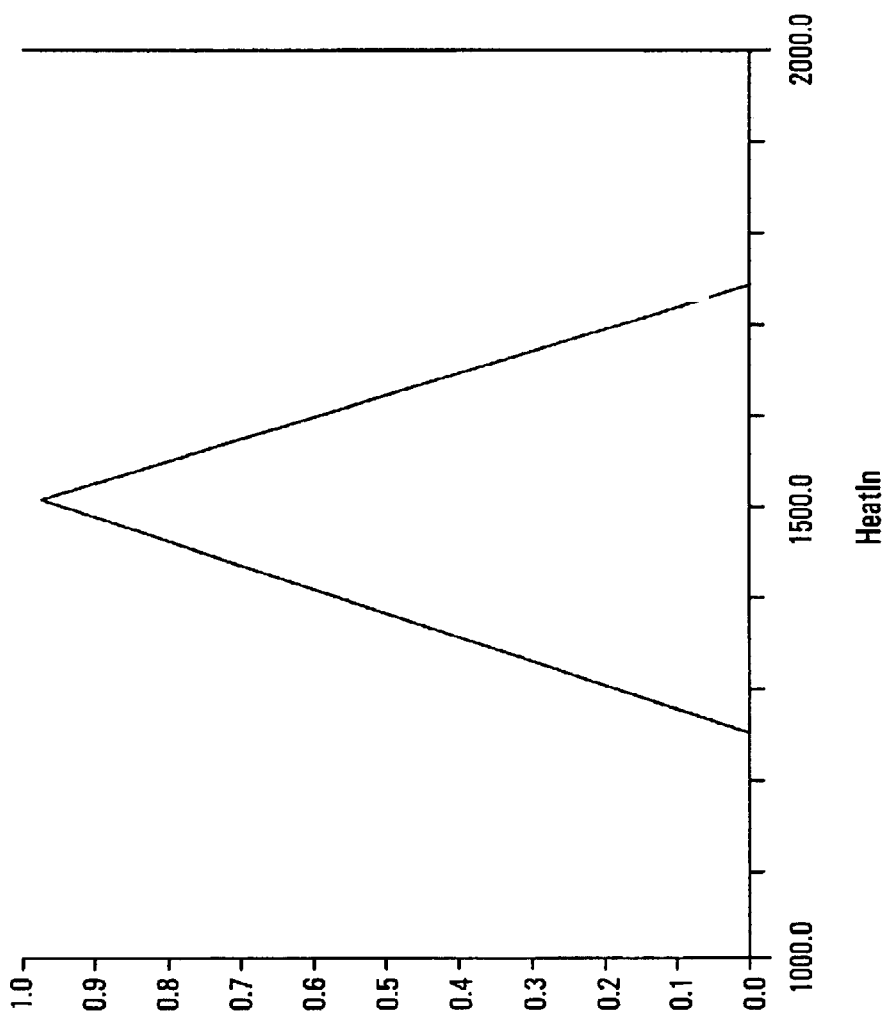
FIG. 9 is an exemplary triangular membership function.
Figure 10:
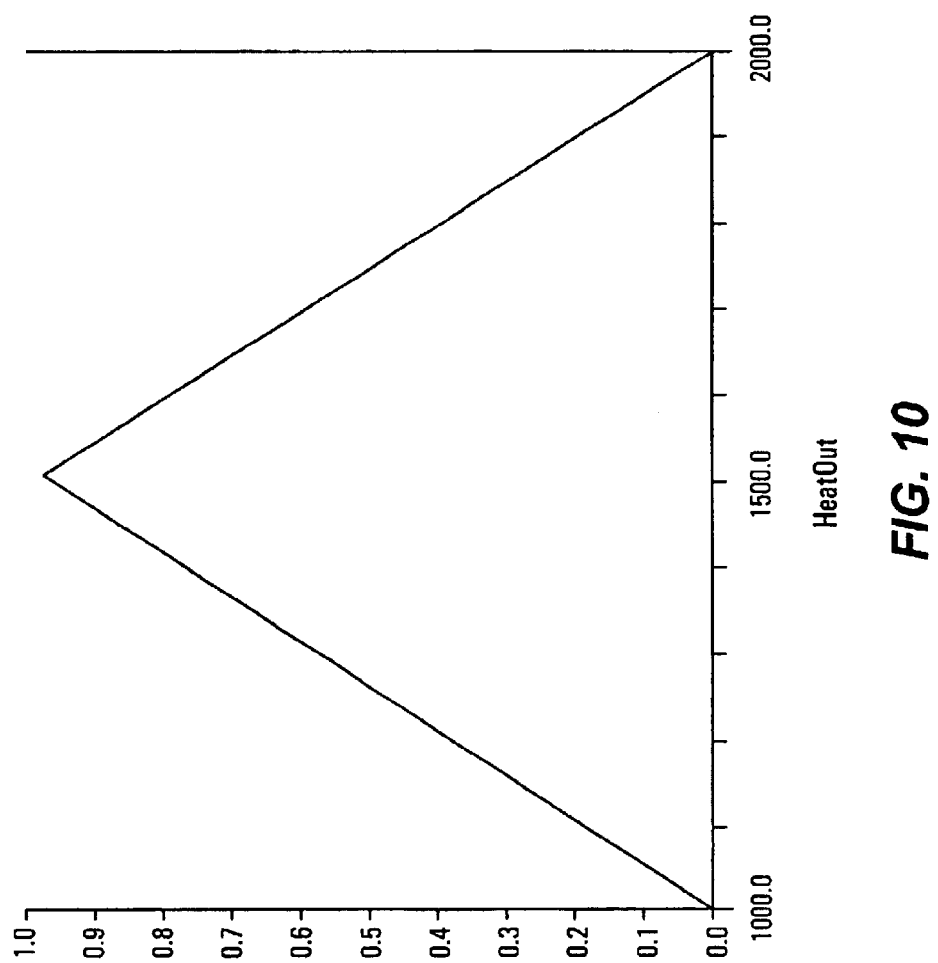
FIG. 10 is another exemplary triangular membership function.
Figure 11:
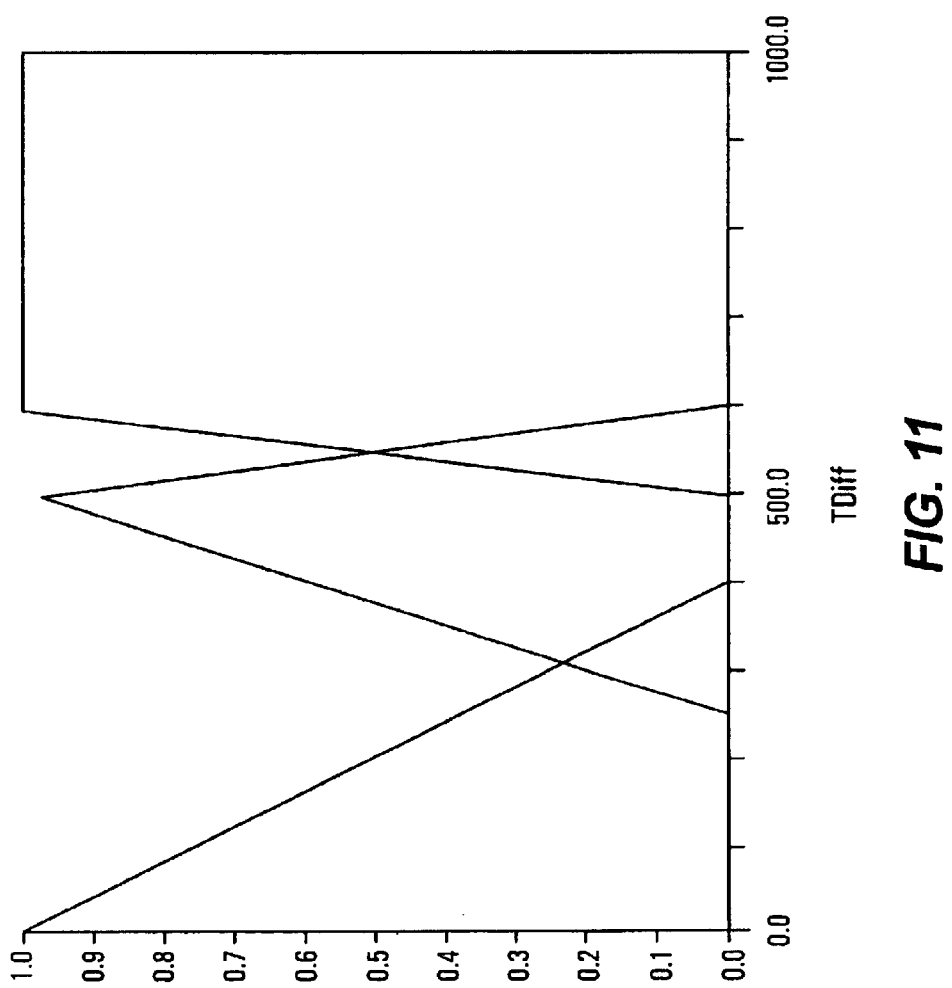
FIG. 11 is another exemplary triangular membership function.
Figure 12:
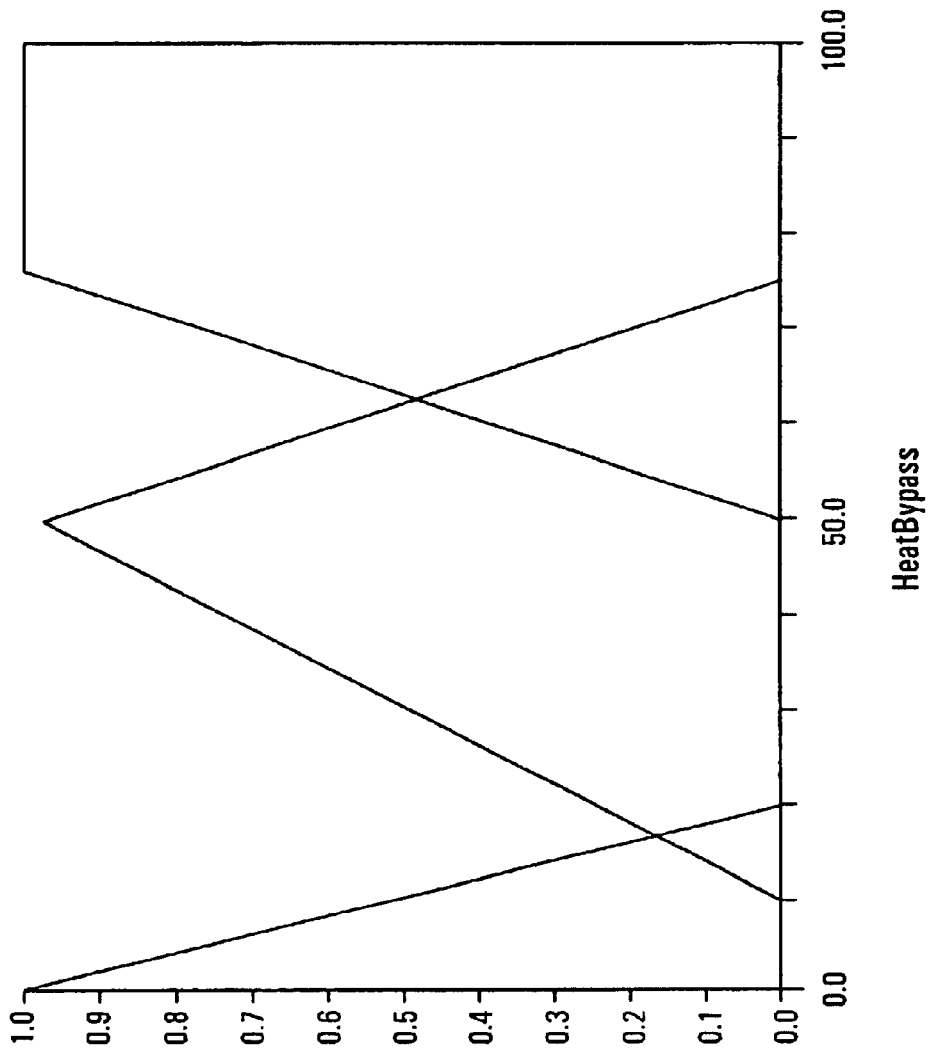
FIG. 12 is another exemplary triangular membership function.

Illustrated in FIG. 8 is another downward view of the control surface. The rule numbers associated with the design coordinates are indicated in nine of the locations. A single rule governs the priority in these areas. The arrows indicate regions of the control surface where more than one rule applies and interpolation is used. Trapezoidal membership functions along the axes allegorize overlapping areas where more than one label of an input is partially true at the same time. The centroids of these trapezoids can be adjusted to alter the shape of the control surface. Of course, shapes other than trapezoids could be used to describe the membership functions. For example, triangular membership functions are shown in FIGS. 9–12, which correspond to the exemplary rules given above.

Given the dynamic environment in which such a system is deployed, determining the best shape for the control surface is a moving target. Therefore, the control surface can be continually adjusted during operation to home in on the optimal shape and optimize the efficiency of the system. In a first embodiment, each input axis is scaled to distribute the range of values. Of course, any number of moving average and scaling functions could be used to adapt the control surface according to this method.

In a second embodiment, the weights of the rules and/or the centroids of the trapezoidal membership functions are adjusted (in effect the shape of the control surface is adjusted) in response to one or more performance metrics. Performance metrics are any type of feedback the system receives. In one embodiment, the system adjusts one or more of the weights and/or centroids in a random direction. If the performance metric improves, the adjustment continues in the same direction. If the performance metric degrades, another random direction is chosen. Eventually, in a stable environment, the system will converge on a small set of near optimal control surfaces (i.e., a circle of convergence). In a dynamic environment it will continue to chase the optimal control surface. Large adjustments will converge faster, but will also create a large circle of convergence. Of course, the size of the adjustment need not be constant. The system could use large adjustments when necessary to converge and then small adjustments to linger in a tight circle of convergence.

The modeled system is preferably continuous. Under various circumstances discrete models are used as appropriate to either enhance the calculation or decrease the time needed for calculations. Generally, a lumped parameter representation is used in the analysis in a well known manner. This allows for the use of standard differential equations as opposed to partial differential equations. The initial optimization is done assuming the system is deterministic rather than stochastic. After the initial optimization is completed, a probabilistic optimization is done to account for uncertainties in data and forecasts.

Preferably, the index of performance is based upon a generic system that is simulated using a computer simulation modeling system. Input and output from this simulation is done through an interface with a numeric computational computer program. System optimization is done through computer routines that utilize custom designed functions as well as those available in the numeric computational computer program. A building model is interfaced with the numeric computational computer program to provide building thermal requirements as a function of time.

This methodology is not specific to any particular computer product. In one embodiment, MATHCAD®, a general purpose modeling program, is used for the modeling of the building. The standard program has been modified to account for various building requirements, including but not limited to thermal output, solar heating output, geographic orientation, and insulation. This program then outputs to MATLAB® from Mathsoft, Inc., which is used for the numeric computational computer program. This is a broad modeling system that was programmed for the energy management package, which accounts for the various heat sources, the capability of heat storage, the maximum temperature within the heat storage, and what to do with excess heat once the maximum heat storage temperature is reached. SIMULINK®, also from Mathsoft, interfaces with MATLAB® and is used for the simulation. This program provides a prediction of the amount of BTUs produced within the system at any given time, depending on the amount of energy available. OPTIMIZATION TOOLBOX®, also from Mathsoft, is used for the optimization routines.

The net effect of this multi-dimensional optimization scheme is to choose the blend of energy sources that produces the desired energy configuration of the building and minimizes the total energy cost and any negative environmental impact of the building.

The global energy control system optimizes the sources of electrical and thermal energy so as to minimize the overall energy costs of the building to less than that provided by conventional energy source options. This system continually regulates the balance between energy production and storage so as to minimize cost within the constraints of the energy reliability, quality and usage patterns of the building. As a result of this optimization, it is possible to run the combined heat and power system in a base loaded mode of operation rather than a peaking mode. This allows the system to run continuously because it is less weather dependent. This, in turn, greatly enhances the economic and environmental benefits of the system.

The foregoing description is for the purpose of teaching those of ordinary skill in the art the best mode of carrying out the invention and is illustrative only. Modifications and alternative embodiments of the invention will be apparent to those skilled in the art in view of this detailed description of the exemplary embodiments. The details of the disclosed structure may be varied substantially without departing from the scope or spirit of the invention, and the exclusive use of all modifications within the scope of the appended claims is reserved.

What is claimed:

1. A method of selecting an energy source option, the method comprising:

determining a current energy requirement, the current energy requirement including a current electrical energy requirement and a current heat energy requirement;

determining a first energy source option which satisfies the current energy requirement, the first energy source option having a first remote source component and a first local source component, the first remote source component being indicative of a first amount of energy to be purchased from a centralized energy generator, the first local source component being indicative of a first amount of energy to be generated by a distributed energy generator;

determining a second energy source option which satisfies the current energy requirement, the second energy source option having a second remote source component and a second local source component, the second remote source component being indicative of a second amount of energy to be purchased from the centralized energy generator, the second local source component being indicative of a second amount of energy to be generated by the distributed energy generator;

determining a current electrical energy cost and a current heat energy cost;

determining a current electrical energy availability and a current heat energy availability;

determining an energy model, the energy model including a time period, a putative electrical energy requirement associated with the time period, a putative electrical energy cost associated with the time period, a putative heat energy requirement associated with the time period, and a putative heat energy cost associated with the time period; and selecting the first energy source option instead of the second energy source option based on the current electrical energy cost, the current heat energy cost, the current electrical energy availability, the current heat energy availability, and the energy model.

2. A method as defined in claim 1, wherein the centralized energy generator comprises an electrical grid system.

3. A method as defined in claim 1, wherein the distributed energy generator comprises a micro-turbine system.

4. A method as defined in claim 1, including the step of providing a fast response thermal storage system, and wherein the step of determining a current electrical energy availability and a current heat energy availability comprises the step of determining an amount of heat stored in the fast response thermal storage system.

5. A method as defined in claim 1, wherein at least a portion of the energy model is based on prior usage patterns.

6. A method as defined in claim 1, wherein at least a portion of the energy model is entered into an energy control system by a human operator.

7. A method as defined in claim 1, wherein the step of selecting the first energy source option instead of the second energy source option comprises the step of executing a fuzzy logic algorithm.

8. A method as defined in claim 7, wherein the execution of the fuzzy logic algorithm requires an actual cost of natural gas, an actual cost of grid supplied electrical energy, a current heat requirement, and a current electrical energy requirement as input variables to the fuzzy logic algorithm.

9. A method as defined in claim 8, wherein the execution of the fuzzy logic algorithm further requires an actual cost of electrical solar energy and an actual cost of thermal solar energy as input variables to the fuzzy logic algorithm.

10. A method as defined in claim 8, wherein the execution of the fuzzy logic algorithm further requires a heat storage cost and a heat storage capacity as input variables to the fuzzy logic algorithm.

11. The method as defined in claim 8, wherein the execution of the fuzzy logic algorithm further requires an efficiency metric and reliability metric associated with an energy source as input variables to the fuzzy logic algorithm.

12. A method as defined in claim 8, wherein the execution of the fuzzy logic algorithm produces an index of performance as an output variable from the fuzzy logic algorithm.

13. A method as defined in claim 12, wherein the execution of the fuzzy logic algorithm produces an actual cost of energy as an output variable from the fuzzy logic algorithm.

14. A method as defined in claim 1, wherein the step of selecting the first energy source option instead of the second energy source option comprises the step of executing a neural network algorithm.

15. A method of selecting an energy source option, the method comprising:

continuously monitoring an electrical energy load and a thermal energy load, and determining a current energy requirement, the current energy requirement including a current electrical energy requirement and a current heat energy requirement;

determining a first energy source option which satisfies the current energy requirement, the first energy source option having a first remote source component and a first local source component, the first remote source component being indicative of a first amount of energy to be purchased from a centralized energy generator, the first local source component being indicative of a first amount of energy to be generated by a distributed energy generator;

determining a second energy source option which satisfies the current energy requirement, the second energy source option having a second remote source component and a second local source component, the second remote source component being indicative of a second amount of energy to be purchased from the centralized energy generator, the second local source component being indicative of a second amount of energy to be generated by the distributed energy generator;

determining a current electrical energy cost and a current heat energy cost;

determining a current electrical energy availability and a current heat energy availability;

determining an energy model, the energy model including a time period, a putative electrical energy requirement associated with the time period, a putative electrical energy cost associated with the time period, a putative heat energy requirement associated with the time period, and a putative heat energy cost associated with the time period; and selecting the first energy source option instead of the second energy source option based on the current electrical energy cost, the current heat energy cost, the current electrical energy availability, the current heat energy availability, and the energy model, and wherein selecting the first energy source option instead of the second energy source option comprises the step of executing a fuzzy logic algorithm.

16. The method as defined in claim 15, wherein the centralized energy generator comprises an electrical grid system.

17. The method as defined in claim 15, wherein the distributed energy generator comprises a micro-turbine system.

18. The method as defined in claim 15, including the step of providing a fast response thermal storage system, and wherein the step of determining a current electrical energy availability and a current heat energy availability comprises the step of determining an amount of heat stored in the fast response thermal storage system.

19. The method as defined in claim 15, wherein at least a portion of the energy model is based on prior usage patterns.

20. The method as defined in claim 15, wherein at least a portion of the energy model is entered into an energy control system by a human operator.

21. The method as defined in claim 15, wherein the execution of the fuzzy logic algorithm requires an actual cost of natural gas, an actual cost of grid supplied electrical energy, a current heat requirement, and a current electrical energy requirement as input variables to the fuzzy logic algorithm.

22. The method as defined in claim 21, wherein the execution of the fuzzy logic algorithm further requires an actual cost of electrical solar energy and an actual cost of thermal solar energy as input variables to the fuzzy logic algorithm.

23. The method as defined in claim 21, wherein the execution of the fuzzy logic algorithm further requires a heat storage cost and a heat storage capacity as input variables to the fuzzy logic algorithm.

24. The method as defined in claim 21, wherein the execution of the fuzzy logic algorithm further requires an efficiency metric and reliability metric associated with an energy source as input variables to the fuzzy logic algorithm.

25. The method as defined in claim 21, wherein the execution of the fuzzy logic algorithm produces an index of performance as an output variable from the fuzzy logic algorithm.

26. The method as defined in claim 21, wherein the execution of the fuzzy logic algorithm produces an actual cost of energy as an output variable from the fuzzy logic algorithm.

27. The method as defined in claim 15, wherein the step of selecting the first energy source option instead of the second energy source option comprises the step of executing a neural network algorithm.

* * * * *